July 15, 1941. H. H. BEASLEY 2,249,594
LIQUID MEASURING AND DELIVERING APPARATUS
Filed Feb. 11, 1941

Inventor
Harold Hohmyard Beasley
per. Rayner & Co
Attorney.

Patented July 15, 1941

2,249,594

UNITED STATES PATENT OFFICE 2,249,594

LIQUID MEASURING AND DELIVERING APPARATUS

Harold Holmyard Beasley, Bristol, England

Application February 11, 1941, Serial No. 378,386
In Great Britain September 19, 1939

4 Claims. (Cl. 221—95)

This invention relates to apparatus for measuring and delivering liquids, and more particularly to apparatus for delivering measured quantities of liquid into suitable portable containers, for example, charging cartons or other containers with milk, mineral waters and oil.

The chief object of this invention is to prevent or minimise surge, bubbling or frothings of the liquid when being received on a measuring section of the apparatus as a part of the cycle of operations appropriate to transferring the liquid from a supply source or reservoir to the receptacle such as a carton. With liquid measuring and delivering apparatus it is found that accurate measuring, or clean and rapid delivery, of liquid is impeded or rendered uncertain when the liquid is measured by overflowing into a measuring vessel or chamber from a reservoir due to the liquid, as it flows down over the rim of the measuring vessel or chamber, forming a pocket or seal tending to trap air in the vessel or chamber, the escaping air consequently agitating or splashing the inflowing liquid and setting up surge or foaming, this action being particularly noticeable with certain liquids such as milk. Another object of this invention is to provide with such a form of measuring means, a device which prevents the formation of an air pocket or a liquid seal, and affords ready escape for the air displaced by the inflowing liquid.

In carrying one form of this invention into practice a reservoir forming the said source of direct supply of the liquid accommodates a liquid displacing member, and a measuring and delivery chamber open at its top, and with an outlet in its base adapted to be opened and closed periodically to charge containers successively disposed beneath it, said displacing member being adapted to be displaced relatively to the liquid within the reservoir to cause liquid in the reservoir to flow over the rim of the said chamber so as to charge the chamber completely. The periphery of the said chamber is preferably completely surrounded by the liquid in the reservoir so that liquid flows over the rim of the chamber in a substantially uniform manner at all points on the rim of the chamber, and the chamber is filled quickly. It is found that if the liquid is free to flow into the whole of the top or mouth of the chamber without any restricting or directing means, it converges inwards from all points of the rim and forms a somewhat cone shaped seal of liquid near the top of the chamber which tends to trap the air in the chamber with the result that the air bubbles or surges upwards through the inflowing liquid. This action is the cause of frothing or surging of the liquid, and this fault is remedied by locating substantially concentrically within the rim of the chamber an upstanding vent tube which depends a short distance into the chamber and extends above the highest level of the liquid in the reservoir. An annular inlet mouth is formed between the tube and the rim of the chamber, and consequently the liquid flowing into the chamber is directed down the inner wall of the chamber so as to leave a substantially concentric air escape central zone communicating with the interior of the said tube. The lower end of the tube may be slightly flared to direct the inflowing liquid against the inner wall of the chamber.

In order that this invention may be clearly understood and readily carried into effect a sheet of drawings is appended hereto illustrating embodiments thereof, and wherein.

Figure 1:
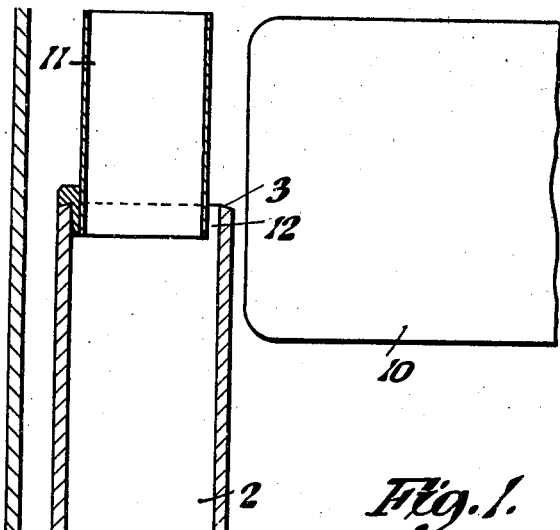
Fig. 1 is a broken sectional elevation view showing a part of a reservoir and one measuring chamber therein.

Referring to the drawing, the invention is shown applied to liquid measuring apparatus in which a reservoir 1 is periodically charged to a predetermined level with liquid, each charging being followed by a delivering operation, so that charging and delivering alternate. The reservoir is shown containing a measuring chamber 2, but in practice there would be preferably a number of these chambers. The chamber 2 is open at its top, its rim 3 preferably being slightly bevelled as shown to ensure a clean overflow of liquid from the rim into the chamber. The base of the chamber is suitably secured in a liquid tight manner to the base of the reservoir 1 and preferably in a readily detachable manner to facilitate replacement and cleaning, this conveniently being effected by screwing a threaded concentric boss 4 of a valve cap 5 into the base of the chamber 2 the annular upper face of the cap 5 abutting against the base of the reservoir 1.

The valve cap 5 carries a concentric slidable valve stem 6, the upper end of which is formed with a conical valve 7 seating by gravity against the top of the centre bore of the valve cap to seal the lower end of the measuring chamber 2. The valve stem is tubular and open at its lower end, to transfer liquid to a receptacle, such as a carton, when the valve is raised, this raising being effected by the rim of the receptacle being engaged by a flange 8 on the lower end of the tubular valve stem. Relatively wide area escape openings 9 are provided in the top of the tubular valve stem to allow free escape of liquid down the valve stem.

Liquid is overflowed from the reservoir 1 into the measuring chamber 2 by the displacement of a float or other suitable body 10 relatively to the reservoir 1, for example, by moving the reservoir up, and when the chamber 2 is full moving the reservoir down beyond the position where the flange 8 of the valve stem engages the rim of the carton or other receptacle disposed beneath the reservoir, thus lifting the valve and delivering the liquid from the chamber 2 into the container.

The float 10 or other suitable liquid displacing member acts to displace the liquid and to charge the reservoir 1 the requisite amount to ensure that when all of the chambers 2 are filled the liquid level in the reservoir is not above the rims of the chambers 2.

The foregoing details of construction illustrate a convenient arrangement of measuring and delivering means, but the present invention is primarily concerned with the provision of means to ensure that when the liquid flows over the rim 3 of the chamber 2, it does not converge to form on the upper part of the chamber a seal of liquid impeding the free escape of air from the chamber for the reasons already given. The said means takes the form of an air vent in the upper end of the chamber 2, so arranged as to prevent the formation of an air pocket or liquid seal in the chamber 2.

The air vent shown, comprises a tube 11 open at both ends and concentric in relation to the chamber 2. The tube 11 is narrowly spaced within the chamber 2, and depends slightly beyond the rim 3 to afford a narrow annular mouth 12 for the admission of liquid to the chamber. The top of the tube 11 is disposed above the highest level of the liquid in the reservoir 1.

The provision of a vent tube 11 in the manner shown provides a baffle for the inflowing liquid which ensures that the liquid will not converge from the rim 3 to trap the air in the chamber, and consequently the level of the liquid in the chamber 2 builds up in a smooth manner from a somewhat annular section flowing liquid, and air can escape freely along the central part of the chamber to the vent tube 11.

Figures 2, 3:
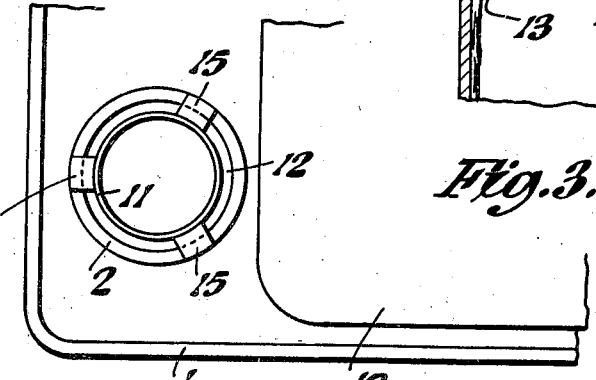
Fig. 2 is a plan view of Fig. 1.
Fig. 3 is a broken detail sectional elevation showing one form of the beforesaid flared vent tube.

If desired, the vent tube 11 may be shaped externally to assist in directing the inflowing liquid against the inner surface of the measuring chamber 2, and for this purpose, the lower end of the tube 11 is shown in Fig. 3 of somewhat flared curvilinear configuration, the peripheral part of the tube in the plane of the rim 3, being narrower than the lower end of the tube, such lower end preferably being merged in a convex manner as at 13 into a convex narrow part 14.

The vent tube can be supported by distance pieces 15 fitted in the rim 3, or by means above the measuring chamber.

In the event of the flange 8 of the valve stem 6 completely covering the mouth of the carton or other receptacle, one or more radial or other suitable air vents can be provided in such flange to ensure a rapid and clean flow of liquid into the receptacle.

By means of the present invention surging or frothing of the liquid in liquid measuring and delivering apparatus is obviated at the measuring and delivering stage, thus ensuring accurate, clean and quick operation.

I claim:

1. In liquid measuring and delivering apparatus a reservoir, a measuring chamber freely communicating at its upper end with the interior of the reservoir, means to displace liquid from the reservoir into the measuring chamber by a level raising operation, a valve device at the lower end of the measuring chamber adapted to be operated to discharge the liquid from the chamber, and a substantially tubular baffle depending into the upper end of the measuring chamber and preventing convergence of the inflowing liquid in the upper part of the chamber to obviate a liquid seal or air pocket.

2. In liquid measuring and delivering apparatus a reservoir, a measuring chamber freely communicating at its upper end with the interior of the reservoir, means to displace liquid from the reservoir into the measuring chamber by a level raising operation, a valve device at the lower end of the measuring chamber adapted to be operated to discharge the liquid from the chamber, a tubular air vent extending at its lowest end below the rim of the measuring chamber and at its upper end above the highest level of liquid in the reservoir, the periphery of the tubular air vent being narrowly spaced from the rim of the chamber to afford a substantially annular inlet opening.

3. In liquid measuring and delivering apparatus a reservoir, a measuring chamber freely communicating at its upper end with the interior of the reservoir, means to displace liquid from the reservoir into the measuring chamber by a level raising operation, a valve device at the lower end of the measuring chamber adapted to be operated to discharge the liquid from the chamber, a tubular air vent depending within the measuring chamber a slight distance below the rim of the measuring chamber and extending upwardly above the predetermined level for the liquid in the reservoir, and a lower end to the tubular vent so shaped and dimensioned as to provide a clearance between the rim of the measuring chamber and the perimeter of said tubular air vent affording an inlet for the liquid displaced from the reservoir into the measuring chamber.

4. In liquid measuring and delivering apparatus a reservoir, a measuring chamber freely communicating at its upper end with the interior of the reservoir, means to displace liquid from the reservoir into the measuring chamber by a level raising operation, a valve device at the lower end of the measuring chamber adapted to be operated to discharge the liquid from the chamber, a tubular air vent, a flared lower end to said air vent, said air vent depending within the measuring chamber a slight distance below the rim of the measuring chamber and extending upwardly above the predetermined level for the liquid in the reservoir and also being so shaped and dimensioned at its lower end as to provide a clearance between the rim of the measuring chamber and the perimeter of said tubular air vent affording an inlet for the liquid displaced from the reservoir into the measuring chamber.

HAROLD HOLMYARD BEASLEY.